Jan. 9, 1945.                T. H. KRUEGER                2,366,971
                          DISPENSER FOR TACKY TAPE
                     Filed April 15, 1942        2 Sheets-Sheet 1
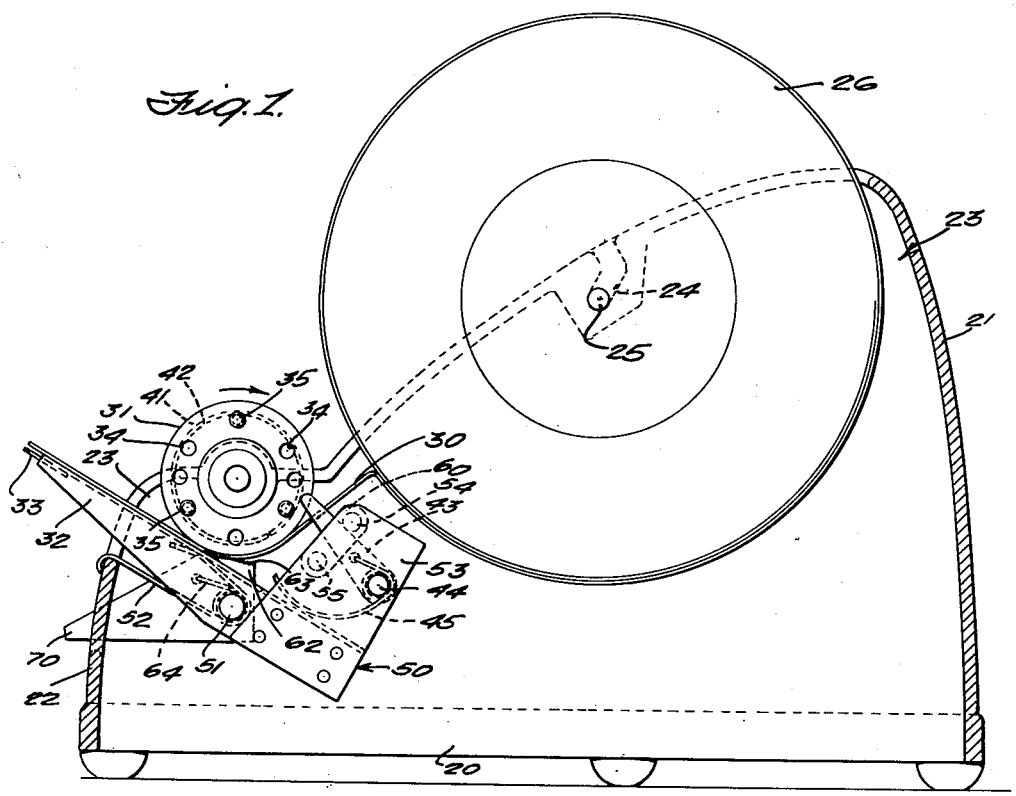
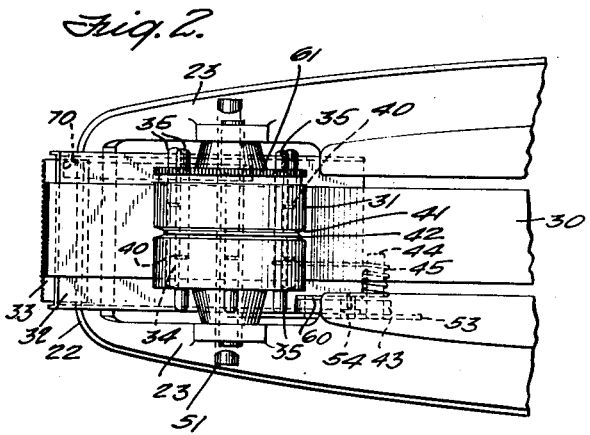
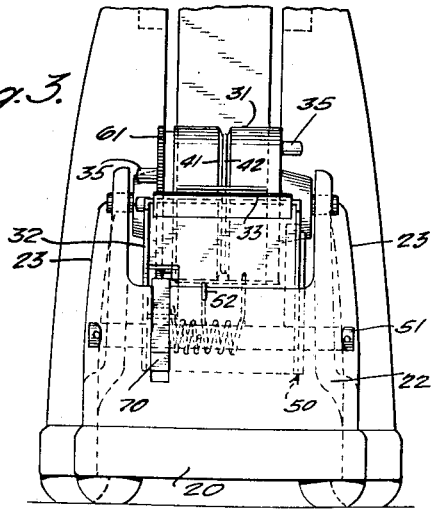
INVENTOR
THEODORE H. KRUEGER
BY
Moser & Nolte
ATTORNEYS Jan. 9, 1945. T. H. KRUEGER 2,366,971
DISPENSER FOR TACKY TAPE
Filed April 15, 1942 2 Sheets-Sheet 2
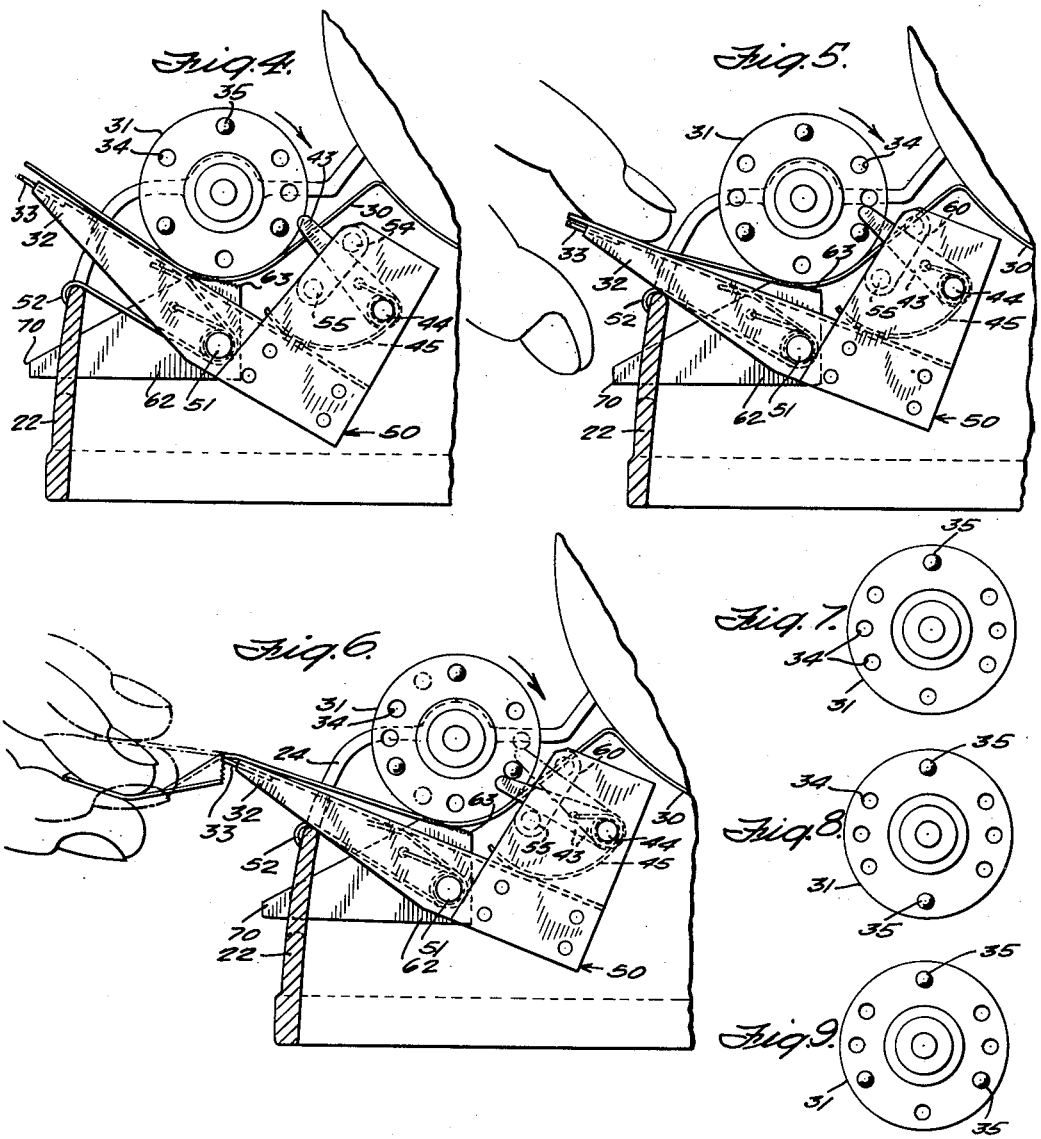
INVENTOR
THEODORE H. KRUEGER
BY
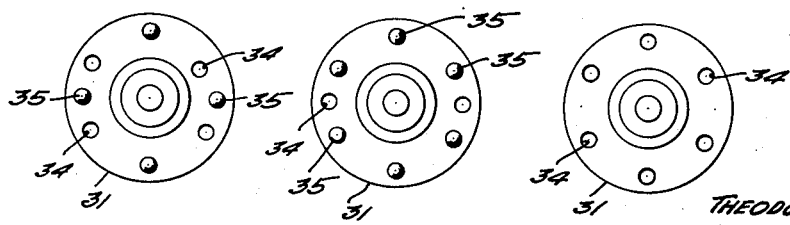
ATTORNEYS Patented Jan. 9, 1945

2,366,971

UNITED STATES PATENT OFFICE 2,366,971

DISPENSER FOR TACKY TAPE

Theodore H. Krueger, Stratford, Conn., assignor to Better Packages Incorporated, a corporation of New York Application April 15, 1942, Serial No. 439,061

19 Claims. (Cl. 164—39)

This invention relates to improvements in dispensers of strip material and more particularly relates to such dispensers in which the material dispensed is measured into predetermined lengths while being dispensed.

The invention is especially adapted to be applied to the dispensing of pressure sensitive strip material and tape, known generally as non-offsetting tape, the adhesive of which retains its adhesive quality either permanently or during the period of use. The invention is applicable to all kinds of pressure sensitive tapes, as well as some other adhesive and non-adhesive tapes.

Apparatus which relies on the tacky nature of tape for measuring purposes has been proposed heretofore, but such apparatus has been subject to the difficulty that setting the measuring apparatus for measurement of different lengths of tape could only be accomplished by very inconvenient means, including the removal of tape from the machine and the replacing of certain parts in the machine, all of which means a waste in the time of the operator, as well as maintaining a separate part for each different length of tape which, since the part may be rather small, is subject to the possibility of becoming lost when not in use. Furthermore, it is obvious that such a machine is not useful at all where two or three different lengths are desired to be dispensed successively i. e., as in the case where a standard package requiring different lengths for middle and ends is being sealed.

It is an object of this invention to provide a tape dispenser particularly adapted for dispensing pressure sensitive adhesive tape in which the tackiness of the tape cooperates with the mechanism of the dispenser to measure the tape as it is drawn from the machine.

It is also an object of the invention to provide a dispenser in which the length of tape dispensed may be immediately and conveniently changed to suit the needs of the operator.

A further object of the invention is to provide a dispenser for pressure sensitive adhesive tape in which the tape is conveniently presented with its active side uppermost in position for ready and convenient application to a point of use.

A further object of the invention is to provide a roller measuring device which contacts the adhesive side of the tape as the tape is drawn from the machine, which measuring device is provided with conveniently located stops, the stops being adjustable in and out of active position to permit the dispensing of varying predetermined lengths of tape, or if all of the stops are in inactive position to permit the dispensing of any length of tape desired by the operator.

Further objects will appear hereinafter from the more detailed description of a preferred form of apparatus embodying this invention, comprising drawings and the description thereof.

In the drawings

Figure 1 is a side elevation of the machine of this invention, with the side wall removed and with certain portions of the frame in section.

Figure 2 is a top elevation, particularly showing the measuring device of the invention, parts of the machine being broken away and parts of measuring device being in section.

Figure 3 is a front elevation of the machine, the upper part of the framework being broken away.

Figure 4 is a detail side elevation showing the position of the mechanism before the tape is withdrawn from the machine.

Figure 5 is a view similar to Figure 4 showing the position of the mechanism when the tape has been grasped for withdrawal.

Figure 6 is a view similar to Figures 4 and 5, showing the position of the mechanism at the end of the withdrawing stroke and while the withdrawn end of the tape is being severed.

Figures 7 through 12 are side elevations of the measuring roller showing varying settings of the measuring stop.

Referring more particularly to the drawings, particularly Figure 1, a machine embodying the principles of this invention is shown having base member 20, rear wall 21 and front wall 22. The side walls 23 have formed in them slots 24 which carry an axle 25 on which the roll 26 of tape is mounted to revolve. The tape web 30 issues from the lower part of the roll 26 and passes under the guiding and measuring roller 31 with the gummed side of the tape contacting the measuring roller, and the ungummed side of the tape contacting the top of the feed table 32 and thus out of the machine. When dispensed, a portion of tape is severed from the tape remaining in the machine by the operator's downward movement of his hand drawing the tape against the cut-off blade 33 (see Figure 6). The edge of the blade may be serrated as shown in Figure 2 for convenience in cutting. It will be understood that, due to the pressure sensitive nature of the tacky tape, the portion of it which contacts the roller at 31 will adhere thereto until pulled off.

The roller 31 is provided with a series of transverse holes 34. These holes penetrate the roller 31 as shown in Figure 2, and may be located parallel to the roller axis and spaced around the roller center at any desired intervals. Any convenient disposition of the holes 34 may be resorted to, it being usually convenient to locate the holes equi-distant from the axis of the roller and equi-distant from each other, so that the roller is substantially divided into a plurality of equal fractional parts.

Into the holes 34 are inserted the stop pins 35 which fit somewhat loosely therein and which are preferably somewhat longer than the width of the roller itself, so that the pins will extend from one side or the other of the roller when positioned therein. In order to insure that the pins may be conveniently retained by the roller in the positions set by the operator, two shallow circular notches 40 are provided in each pin, the notches being located with predetermined relation to a circular groove 41 in the roller, which groove preferably opens into the holes 34 and contains the circular wire spring 42. The notches in the pins 35 are situated so as to key with the spring 42 when either end of the pins is approximately flush with the side surface of the roller 31, so that the pins normally have two adjusted positions causing them to extend from one or the other side of the roller as shown in Figure 2 which shows some of the pins set to project from one side and some from the other.

It will be understood that the spring 42 is only tight enough to hold the pins from ordinary displacement and that by pressure of the operator's fingers the pins may be moved from a position extending from one side of the roller to a position extending from the other side of the roller.

It is contemplated that the operator, in removing tape from the machine, can conveniently place his thumb on the tacky side of the tape as it lies on the table 32 as shown in Figure 5, thus depressing the table 32 until it rests upon the top of the front wall 22, and, having moved the table 32 downward and grasped the tape, may exert a pulling stroke terminating in a downward tear-off stroke as illustrated in Figure 6.

The feed table 32 is an extension of the feed table rocker frame 50 which is pivotally mounted on a shaft 51 mounted in side wall 23 and is limited in its downward movement by the front wall 22 and in its upward movement by the roller 31 and is normally held against the roller 31 when feeding is not in progress by the rocker spring 52 coiled around the pivot 51. A latch 43 is pivoted at 44 on the rocker frame extension 53. The latch 43 is urged in a clockwise direction about the pivot 44 by the latch spring 45, the movement of the latch about the pivot being limited by the pins 54 and 55 which are rigidly mounted on the feed table rocker arm extension 53 and are joined by the keeper bar 60 which tends to keep the latch 43 from shifting in a lateral direction. As will be seen from Figures 1 and 4, the action of the spring 52 normally keeps the latch 43 out of the path of the pins 35. When, however, the feed table rocker frame is depressed, as shown in Figure 5, the latch 43 moves into the path of the pins extending from the right side of feed roller 31. As the next extending pin reaches the latch 43, it depresses it against the pin 55, as shown in Figure 6, whereby rotation of the measuring roller 31 is stopped and feeding of the tape ceases because of its adherence to the roller. When the tap is turn off against the knife 33, spring 52 urges the feed table rocker frame 50 back into the position shown in Figure 1 moving the latch 43 out of the path of pins 35, and at the same time latch spring 45 forces the latch 43 in a clockwise direction against the pin 54 whereupon the apparatus is ready for a delivery of a second strip of tape.

As it is ordinarily desirable that the roller 31 only revolve in the direction of the delivery of tape, that is, in a clockwise direction, there is provided a knurled or serrated wheel 61 (Figures 2 and 3) mounted to revolve with the roller 31 and a pawl 62 pivoted at 51 and pressed by pawl spring 64 against the serrated wheel 61. Pawl 62 is preferably provided with knurled or serrated edge 63 bearing against the serrated edge of wheel. It will be seen that from the position of the pawl surface 63, rotation in a counter-clockwise direction will be prevented. It may, however, be desirable at times to permit the free rotation of the measuring roller 31 particularly when a new roll of tape is being applied to the machine and to this end I have provided the pawl extension 70 which extends forwardly of the front wall 22. The operator by raising the extension 70 can remove the pawl 62 from acting position and thus permit free rotation of the measuring roller 31.

The roller 31 will continue to revolve as long as tape is being withdrawn by the operator until a pin 35 strikes the latch 43 and presses it downwardly against the pin 55 so that if only one pin is extending from the right side of the measuring roller 31, as illustrated in Figure 7, a tape strip equal in length to the circumference of the measuring roller will be delivered. In Figure 8 two pins are shown extending from the right side of roller 31 diametrically opposite to each other and consequently a tape strip equal to ½ of the circumference of roller 31 will be delivered. In Figure 9 three pins are located equi-distant from each other and extending from the right side of the roller 31 so that tape strips equal to ⅓ of the circumference will be delivered. In Figure 10 tape strips equal to ¼ of the circumference and in Figure 11 tape strips equal to ⅙ of the circumference are delivered. The position shown in Figure 12 in which no pins project is used when a strip longer than the circumference of the measuring roller is desired. It will be understood, of course, that any suitable arrangement of holes and pins on the feed roller 31 may be provided, depending upon the various lengths desired from the operation of the machine. Furthermore a change in the position of the pins which changes the length of the next delivered strip may be made without affecting the tape in the machine— a mere adjustment in the pin 35 being necessary to provide a different length on the next delivery. This adjustment may be made instantly by pressure of the finger on the end of the pin or pins to be moved.

While I have illustrated and described in detail certain forms of my invention, I do not wish to be understood as limiting myself to the use of such forms, as I realize that changes within the scope of the invention are possible, and I further intend each element or instrumentality recited in any of the following claims to be understood to refer to all equivalent elements or instrumentalities for accomplishing substantially the same result in substantially the same or equivalent manner, it being my purpose to cover my invention broadly in whatever form its principle may be utilized.

I claim:

1. In a tacky tape dispenser a measuring roller adapted to contact the tacky surface of the tape and to cause the tape to adhere thereto by its own adhesive qualities alone, said roller being adapted to rotate with the tape as the tape is withdrawn from the machine, pin means located about the axis of said roller and interchangeably extending from one side or the other of said roller, and stop means engaging said pin means when extending from at least one side of the roller to stop the feed of tape.

2. A tacky tape dispenser having means for holding a supply of tacky tape, a measuring element to measure the length of tape delivered by contact with the tacky side of the tape, said measuring element being adapted to move with the tape by reason of the adhesive contact of the tape therewith, as the tape is withdrawn from the machine by direct manual pull on the uncut end thereof, retractable stop means for stopping the movement of the measuring element and tape after a predetermined length of tape has been withdrawn, and a feed table mounted forwardly of the measuring element in the path of the tape to receive the forward end of the uncut tape coming from the tape supply tacky side up whereby the tape may be grasped by the operator by contact with a portion thereof when the same lies on the feed table and withdrawn out of the machine by direct manual pull on the unsevered end thereof.

3. A tacky tape dispenser having a measuring roll for measuring the tape by contact with said roll, said roll being mounted for rotation with the tape as the tape is withdrawn from the machine and said roll having a plurality of projecting individually retractable stops extending from one side thereof and means acting on said stops when not retracted to prevent further rotation of the roll and further delivery of tape.

4. A tacky tape dispenser having a measuring element to measure the tape and contact with the tacky side thereof, said element having a plurality of projecting individually retractable stops, a latch member adapted to move in and out of the path of said stops and a feed table on which the tape is presented tacky side up.

5. A dispenser as claimed in claim 4 in which the feed table is movable to place the latch in the way of one of said stops to prevent further delivery of tape.

6. A machine as claimed in claim 4 in which the feed table is movable by the hand of the operator withdrawing tape from the machine to place said latch in the path of one of said stops whereby further delivery of tape is prevented, means to return said table and latch to normal position with said latch out of the path of said stops on release of said table by the operator.

7. In a machine for delivering strips of tacky material, a measuring element contacting the tape on its tacky side, a feed table for delivering the tape tacky side up and a cutter associated with said table, said table being movable in a downward direction when said tape is drawn against said cutter, said downward movement of said table preventing further movement of said measuring element.

8. A machine as claimed in claim 7 wherein said cutter is a part of said feed table.

9. In a machine for delivering strips of tacky material, a measuring roller to contact the tacky side of the tape, slidable stop pins mounted about the axis of said roller adjacent the periphery thereof and lying parallel to said axis, said pins being longer than the lateral dimension of said roller and adapted to extend from either one side or the other of said roller and individually slidable on lines parallel to the axis of said roller and a stopping latch acting on the ends of the pins when they extend from one side of said roller to prevent further rotation of said roller.

10. In a machine for delivering strips of tacky material, a measuring roller having a series of stop pins thereon, a depressible feed table having a tear-off cutter associated therewith, said table and cutter being pivoted to permit downward movement thereof during the cutting of the tape and a spring to return the table to normal position after the cutting has been completed, said table also having a latch normally out of the path of the stop members on said roller but moving into the path of said stop members when said table is pivoted in a downward direction.

11. In a machine for delivering strips of tacky material a smooth surfaced measuring roller mounted on an axis transverse to the path of the tape through the machine and measuring the tape by contact with the tacky side thereof, said roller having a series of holes parallel to the axis of mounting and situated near the periphery of said roller, pins in said holes of greater length than the lateral dimension of said roller and a spring about said roller mounted below the tape engaging surface thereof and engaging and holding said pins in adjusted position extending from one or the other sides of said roller.

12. In a machine for delivering strips of tacky material, a measuring roller to contact the tacky side of the tape and a feed table to present the tape tacky side uppermost, said table being pivoted for downward movement away from said roller during the course of delivery of tape and returnable to normal position when the delivery cycle is completed, said table having a rear extension carrying a pivoted latch whereby the downward movement of the table places the latch in position to prevent further rotation of said measuring roller when said table is depressed.

13. In a tacky tape delivering machine a traveling measuring element to which the tape adheres, a movable table for supporting the projecting end of the tape tacky side up and stop means actuated by movement of the table to prevent the further movement of said traveling measuring element and the further delivery of tape.

14. In a machine for delivering strips of tacky material, means for measuring the length of tape delivered, movable means for presenting the projecting end of the tape tacky side up and latch means actuated by said movable presenting means to prevent further movement of said measuring means.

15. A tacky tape dispenser having a measuring element contacting with the tacky side of the tape to measure the tape, said element having a stop thereon, a latch member movable into and out of the path of said stop, a feed table for supporting the projecting end of the tape and movable by the hand of the operator when grasping and withdrawing the tape from the machine, said table being connected with said latch so as to place said latch in the path of said stop whereby engagement of said stop with said latch prevents further delivery of the tape, and means for returning said table and said latch to normal position with said latch out of the path of said stop on release of said table by the operator.

16. A machine for delivering strips of tacky tape having a measuring roller to which the tape adheres, a plurality of selectively retractible stops associated with said roller, a movable support for the projecting end of the tape, and a latch actuated by the movement of the said support for engagement with a selected stop for limiting the travel of said measuring roller.

17. A machine for delivering strips of tacky material having a measuring roller to which the tape adheres, settable stop means for said roller, means for setting said stop means in positions corresponding with different predetermined lengths of tape, a movable support for the projecting end of the tape, and latch means actuated by movement of said support, said latch means cooperating with said settable stop means to stop the delivering of tape at the selected length.

18. A tacky tape dispenser having a measuring roller for measuring the tape by contact with said roller, said roller being mounted for rotation with the tape as the tape is withdrawn from the machine, and a plurality of individually adjustable stops associated with said roller, and movable latch means adapted to cooperate with any selected stop, to prevent further rotation of said roller and stop delivery of tape after a length of tape has been delivered determined by the stop selected.

19. A tacky tape dispenser having a support for a roll of tacky tape, a measuring roller under which the tape from the roll is adapted to be led with its adhesive side in contact with and adhering to said measuring roller, said measuring roller being normally free to rotate due to its contact with the tape as the tape is withdrawn by manually pulling on the end of the uncut tape coming from the supply roll, retractable stop means for stopping the rotation of said measuring roller at desired times, so as to stop the feed of tape and limit its delivery to measured lengths, and a feed table in advance of said feed roller for receiving the tape tacky side up, whereby the tape may be advanced by the operator by contact of his finger with the exposed tacky surface of the tape, and drawn freely out of the machine until the rotation of the feed roller is stopped by the stop means.

THEODORE H. KRUEGER.